United States Patent
Chu

(10) Patent No.: US 8,995,047 B2
(45) Date of Patent: Mar. 31, 2015

(54) THREE-DIMENSIONAL IMAGE DISPLAY AND CONVERTER THEREFOR

(71) Applicant: Samsung Display Co., Ltd., Yongin, Gyeonggi-Do (KR)

(72) Inventor: Chang-Woong Chu, Yongin (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 0 days.

(21) Appl. No.: 14/061,404

(22) Filed: Oct. 23, 2013

(65) Prior Publication Data

US 2014/0355103 A1 Dec. 4, 2014

(30) Foreign Application Priority Data

May 31, 2013 (KR) .................. 10-2013-0063072

(51) Int. Cl.
  *G02B 26/00* (2006.01)
  *G09G 3/34* (2006.01)
  *G02B 27/22* (2006.01)
  *G02F 1/167* (2006.01)

(52) U.S. Cl.
  CPC ........ *G02B 27/2214* (2013.01); *G02B 27/2264* (2013.01); *G02F 1/167* (2013.01)
  USPC .................... 359/296; 359/297; 345/107

(58) Field of Classification Search
  USPC .................... 359/209–297; 345/107
  See application file for complete search history.

(56) References Cited

U.S. PATENT DOCUMENTS 8,035,886 B2 * 10/2011 Jacobson .............. 359/296
8,111,370 B2 * 2/2012 Yamada et al. ......... 349/157
8,542,200 B2 * 9/2013 Lee et al. .............. 345/173

FOREIGN PATENT DOCUMENTS

| KR | 10-2007-0071354 | 7/2007 |
| KR | 10-2008-0069959 | 7/2008 |
| KR | 10-2011-0042672 | 4/2011 |
| KR | 10-2012-0045381 | 5/2012 |

* cited by examiner

*Primary Examiner* — Mohammed Hasan
(74) *Attorney, Agent, or Firm* — F. Chau & Associates, LLC

(57) ABSTRACT

A display device includes a display panel and a converter formed on a front surface of the display panel. The converter performs conversion between a 2-dimensional image and a 3-dimensional image. The converter includes a plurality of protrusion electrodes formed on a first substrate. A plate electrode is positioned on a second substrate facing the first substrate. A transparent medium is positioned between the protrusion electrodes and the plate electrode. A plurality of conductive particles is positioned in the transparent medium.

18 Claims, 9 Drawing Sheets

THREE-DIMENSIONAL IMAGE DISPLAY AND CONVERTER THEREFOR

CROSS-REFERENCE TO RELATED APPLICATION

This application claims priority to Korean Patent Application No. 10-2013-0063072 filed in the Korean Intellectual Property Office on May 31, 2013, the disclosure of which is incorporated by reference herein in its entirety.

TECHNICAL FIELD

Exemplary embodiments of the present invention relate to displays, and more specifically, to a 3-dimensional image display device and a converter therefor.

DISCUSSION OF THE RELATED ART

A three-dimensional ("3D") display includes a display panel and a liquid crystal ("LC") panel disposed on the display panel. The LC panel may alternately form barriers for blocking light and transmissive portions for passing light therethrough. To implement 3D effects, polarizing films need to be used together with the LC panel. Accordingly, the overall size and weight of the 3D display may be increased, and the transmittance of the display may be decreased.

SUMMARY

A display device according to an exemplary embodiment of the present invention is provided. The display device is a three-dimensional ("3D") image display device. The 3D image display includes a display panel for displaying an image. A converter is formed on a front surface of the display panel. The converter performs conversion between a 2-dimensional image and a 3-dimensional image. The converter includes a plurality of protrusion electrodes formed on a first substrate. A plate electrode is positioned on a second substrate facing the first substrate. The plate electrode has a plate shape. A transparent medium is positioned between the protrusion electrodes and the plate electrode. A plurality of conductive particles is positioned in the transparent medium. The plurality of conductive particles may be electrically charged.

The converter may include a barrier and a transmissive region that are formed by applying voltages to the protrusion electrodes and the plate electrode, thus allowing a 3-dimensional image to be displayed.

The plate electrode and/or the plurality of protrusion electrodes may be formed of a transparent conductive material, such as ITO or IZO.

The protrusion electrodes and the plate electrode may be separated from each other by a predetermined interval.

The plurality of protrusion electrodes may extend in a direction in which the barrier extends.

Two adjacent ones of the plurality of protrusion electrodes may be spaced apart from each other by a predetermined interval.

The plurality of conductive particles may be black and may block light. The plurality of conductive particles may include an ink, e.g., E-Ink™.

The display panel may be one of flat display panels including an organic light emitting display panel, a liquid crystal display panel, a plasma display panel (PDP), an electrophoretic display panel, and an electrowetting display panel.

According to an exemplary embodiment of the present invention, a converter for, e.g., a 3D image display device is provided. The converter performs conversion between a 2-dimensional image and a 3-dimensional image displayed by a display panel. The converter includes a plurality of protrusion electrodes formed on a first substrate. A plate electrode is positioned on a second substrate facing the first substrate. The plate electrode has a plate shape. A transparent medium is positioned between the protrusion electrodes and the plate electrode. A plurality of conductive particles is positioned in the transparent medium. The plurality of conductive particles may be electrically charged.

The converter may have a barrier and a transmissive region that are formed by applying voltages to the protrusion electrodes and the plate electrode, thus allowing a 3-dimensional image to be displayed.

The plate electrode and/or the plurality of protrusion electrodes may be formed of a transparent conductive material, such as ITO or IZO.

The protrusion electrodes and the plate electrode may be separated from each other by a predetermined interval.

The plurality of protrusion electrodes may extend in a direction in which the barrier extends.

Two adjacent ones of the plurality of protrusion electrodes may be spaced apart from each other by a predetermined interval.

The plurality of conductive particles may be black and may block light. The conductive particles may include an ink, e.g., E-Ink™.

According to an exemplary embodiment of the present invention, a display comprises a display panel and a converter disposed on the display panel. The converter comprises a first substrate having a plate electrode. A second substrate has a plurality of protrusion electrodes spaced apart from each other by a predetermined distance. A transparent medium is included between the first substrate and the second substrate. The transparent medium includes a plurality of conductive particles. The plurality of conductive particles is configured to interact with the plurality of protrusion electrodes upon application of a voltage between the plate electrode and the plurality of protrusion electrodes to form a barrier and a transmissive region along a direction of the converter. When the display panel displays a two-dimensional image, the barrier is not formed.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EMBODIMENTS

Figure 1:
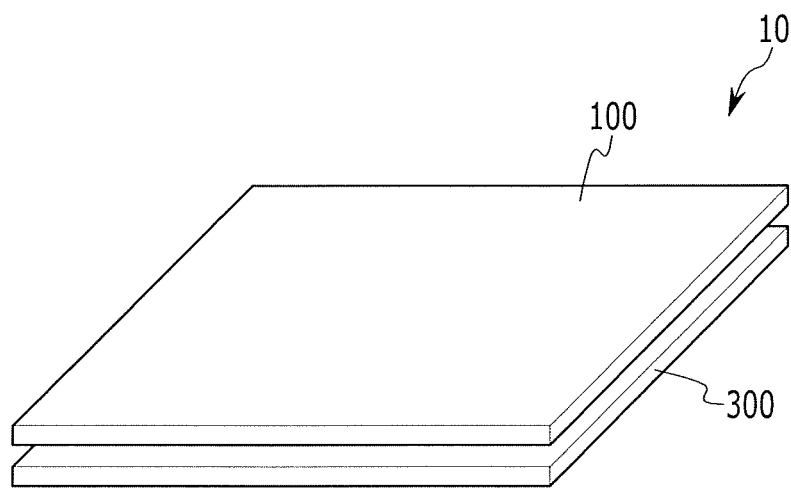
FIG. 1 is a perspective view of a 3D image display device according to an exemplary embodiment of the present invention.

Exemplary embodiments of the present invention will be described in more detail hereinafter with reference to the accompanying drawings. The present invention, however, may be modified in various different ways, and should not be construed as limited to the embodiments set forth herein.

Like reference numerals may designate like or similar elements throughout the specification and the drawings. It will be understood that when an element or layer is referred to as being "on," "connected to," "coupled to," or "adjacent to" another element or layer, it can be directly on, connected, coupled, or adjacent to the other element or layer, or intervening elements or layers may be present. As used herein, the singular forms "a," "an," and "the" are intended to include the plural forms as well, unless the context clearly indicates otherwise.

FIG. 1 is a perspective view of a 3D image display device according to an exemplary embodiment of the present invention.

As shown in FIG. 1, a 3D image display device 10 includes a display panel 300 and a converter 100.

The display panel 300 displays an image including a 2-dimensional ("2D") image and a 3-dimensional ("3D") image. The 2D image may be recognized by a user when displayed by the display panel 300. The 3D image includes a left-eye image and a right-eye image. The left-eye image is applied to a user's left eye and the right-eye image is applied to the user's right eye by the converter 100, and thus, the user may recognize a 3D stereoscopic image.

Various display panels may be used as the display panel 300. For example, one of a plasma display panel (PDP), an organic light emitting display panel, an electrophoretic display panel, a liquid crystal display panel, and an electrowetting display panel may be used as the display panel 300.

The converter 100 is positioned at an upper (front) surface of the display panel 300.

The converter 100 performs conversion and selection that allows an image displayed by the display panel 300 to be viewed by the user as a 2D image or a 3D stereoscopic image.

The converter 100 includes barriers B that extend in a vertical direction of the 3D image display device 10 or in a direction inclined at a predetermined angle with respect to the vertical direction. The barriers B allow a 3D stereoscopic image to be viewed by the user. For example, an image recognized by the user's left eye and an image recognized by the user's right eye are rendered different from each other by the barriers B, and thus, the user may feel a stereoscopic effect.

When the converter 100 displays a 2D image, the barriers are not formed, and thus, an image displayed by the display panel 300 is recognized by the user as it is.

For example, the display panel 300 may display a 2D image, and the converter 100 enables a 3D stereoscopic image to be displayed. The converter 100 enables a stereoscopic image to be displayed by barriers.

Figure 2:
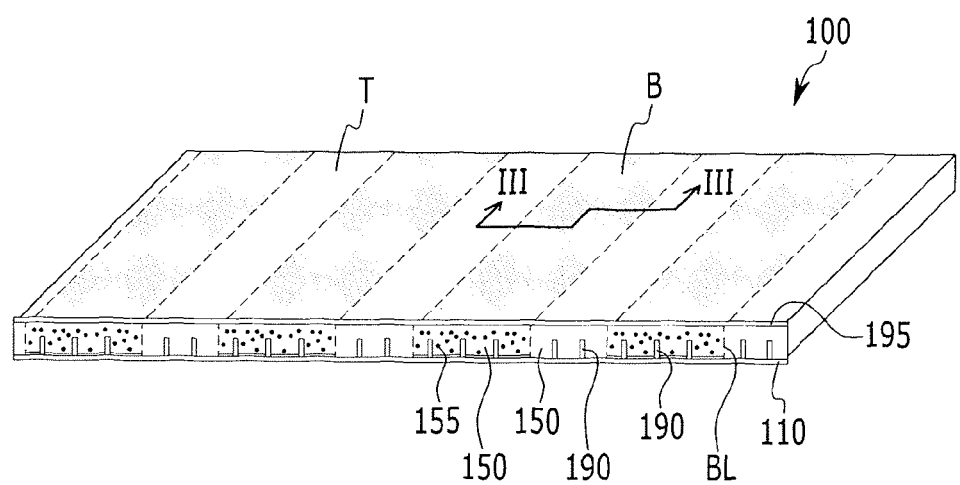
FIG. 2 is a perspective view of a converter for a 3D image display device according to an exemplary embodiment of the present invention.
Figure 3:
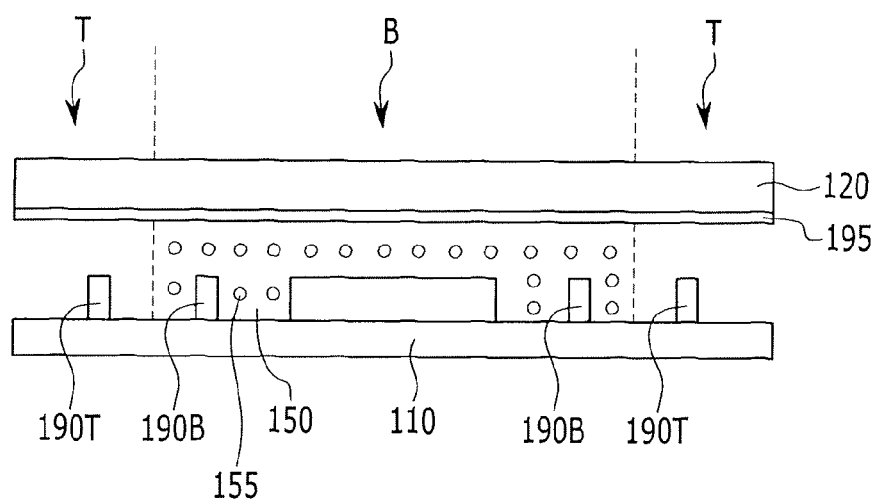
FIG. 3 is a cross-sectional view of a converter for a 3D image display device according to an exemplary embodiment of the present invention.

FIG. 2 is a perspective view of a converter for a 3D image display device according to an exemplary embodiment of the present invention, and FIG. 3 is a cross-sectional view of a converter for a 3D image display device according to an exemplary embodiment of the present invention.

The converter 100 forms barriers B when displaying a 3D stereoscopic image. The converter 100 does not form the barriers B when displaying the 2D image, and thus, the 2D image displayed by the display panel 300 is recognized by the user as it is.

As shown in FIG. 2, the barriers B are formed in the converter 100. The barriers B extend in a vertical direction of the converter 100 or in a direction inclined at a predetermined angle with respect to the vertical direction. Each transmissive region T is formed between two adjacent barriers B. Light incident to the transmissive region T is substantially fully transmitted to the user, and thus, the user may recognize the pixels of the display panel 300.

The barriers B block light emitted from the display panel 300, and thus, the user might not recognize their corresponding pixels. Accordingly, the user's left eye and right eye respectively recognize a left-eye image and a right-eye image, and thus, the user may perceive a 3D stereoscopic effect.

The converter 100 includes a protrusion electrode 190, a plate electrode 195, conductive particles 155, and a transparent medium 150. The converter 100 may further include a lower substrate 110, an upper substrate 120, and a seal member (referring to 115 of FIG. 4 and FIG. 6) that partition the protrusion electrode 190, the plate electrode 195, the conductive particles 155, and the transparent medium 150.

The protrusion electrode 190 of the converter 100 is positioned on the lower substrate 110. The protrusion electrode 190 is protruded by a predetermined height from the lower substrate 110 and extends along a direction in which the barrier B extends. The height of the protrusion electrode 190 is determined according to a voltage applied to the protrusion electrode 190 and the plate electrode 195, characteristics of the conductive particles 155 and the transparent medium 150, and an interval between the protrusion electrode 190 and the plate electrode 195. The protrusion electrode 190 may be formed of a transparent conductive material, such as indium tin oxide (ITO) and indium zinc oxide (IZO) or various metals.

Protrusion electrodes 190 adjacent to each other are parallel to each other and are spaced apart from each other by a predetermined interval. The protrusion electrodes 190 are positioned depending on the position where the barrier B is formed. The position of the barrier B may be changed according to the position of the user and over time, and thus, the protrusion electrodes 190 may also be positioned in the transmissive region T. The protrusion electrodes 190 are electrically separated from each other, and a voltage may be applied to each of the protrusion electrodes 190.

The plate electrode 195 is positioned on the upper substrate 120. The plate electrode 195 has a plate shape. The plate electrode 195 is spaced apart from the protrusion electrode 190 by a predetermined distance. The plate electrode 195 is formed on an entire surface of a display area of the upper substrate 120 for displaying an image display. The plate electrode 195 may be formed of a transparent conductive material such as ITO and IZO.

An electric field is formed by voltages applied to the protrusion electrode 190 and the plate electrode 195, and the barrier B and the transmissive region T are formed while the conductive particles 155 included in the transparent medium 150 are moved by the electric field.

The conductive particles 155 may include a material such as E-Ink™. The conductive particles 155 are black and block light. The conductive particles 155 may be electrically charged. The polarity of the conductive particle 155 may be positive or negative. The diameter or the size of each conductive particle 155 may be measured in nanometers, and more conductive particles 155 may be provided than are shown in the drawings.

The transparent medium 150 is positioned between the protrusion electrode 190 and the plate electrode 195. The transparent medium 150 is formed of a transparent material which may transmit light. The transparent medium 150 has flowability, and thus, the conductive particles 155 may be moved by the electric field. When the conductive particles 155 are moved to the protrusion electrode 190 by the electric field, the barrier B is formed near the protrusion electrode 190.

FIG. 4 to FIG. 7 are views showing an operation of a converter for a 3D image display device according to an exemplary embodiment of the present invention.

Protrusion electrodes 190' shown in FIG. 4 to FIG. 7 are not extended in one direction, unlike the protrusion electrodes 190 of FIG. 2 and FIG. 3, and the protrusion electrodes 190' protrude in a cylinder shape.

Figure 4:
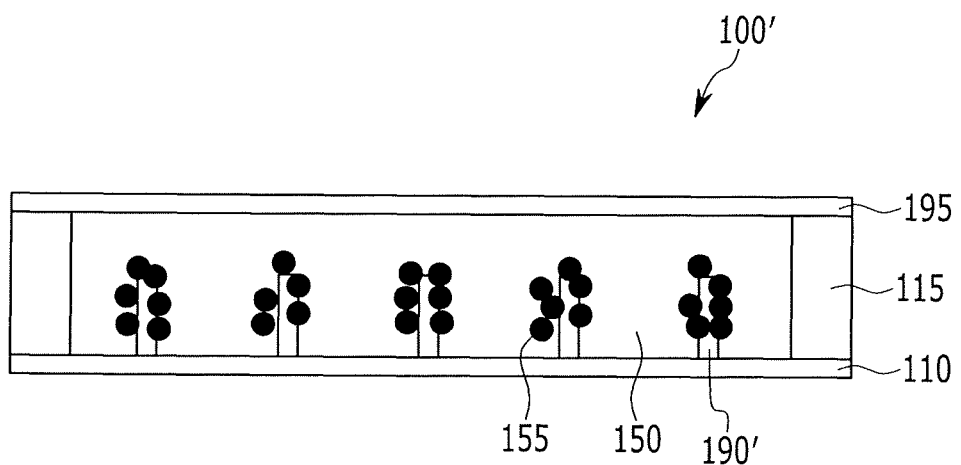
FIG. 4 to FIG. 7 are views of an operation of a converter for a 3D image display device according to an exemplary embodiment of the present invention.
Figure 5:
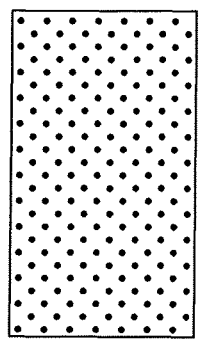
Figure 6:
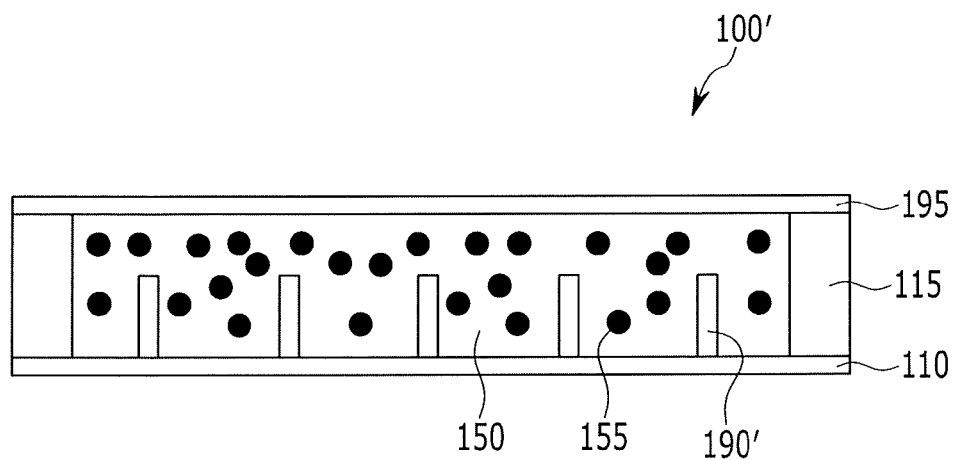
Figure 7:
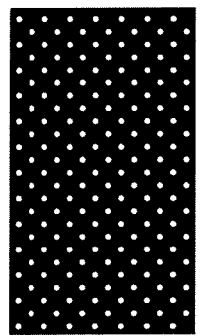

FIG. 4 and FIG. 5 show an example in which the protrusion electrodes 190' attract conductive particles 155, thus forming the transmissive region T, and FIG. 6 and FIG. 7 show an example in which the conductive particles 155 are dispersed in the transparent medium 150, thus forming the barrier B.

As shown in FIG. 4, when a voltage having an opposite polarity of a polarity of the conductive particles 155 is applied to the protrusion electrodes 190', the conductive particles 155 are attracted through the transparent medium 150 to the protrusion electrodes 190' and are gathered or attached to a portion of each protrusion electrode 190'.

Accordingly, as shown in FIG. 5, when viewing from an upper side of the converter 100', the portions of the converter 100' where the protrusion electrodes 190' are positioned appear black, and the remainder of the converter 100' forms the transmissive region T. The size of the protrusion electrodes 190' and the conductive particles 155 is very small, and thus, the portions of the converter 100' where the protrusion electrodes 190' are positioned and thus appear black might not be recognized by a viewer.

As shown FIG. 6, when the same voltage is applied to the plate electrode 195 and the protrusion electrodes 190', no electric field is formed. Accordingly, the conductive particles 155 are positioned at any positions in the transparent medium 150. Accordingly, light is blocked that is emitted from a light source under the converter 100'. Therefore, as shown in FIG. 7, the converter 100' becomes the barrier B. In FIG. 7, white circular spots represent the protrusion electrodes 190' as viewed from an upper side of the converter 100,' and the white circular spots might not be recognized by a viewer when viewing the converter 100'.

The barriers B and the transmissive regions T of the converter 100 may have various arrangements with respect to the pixels of the display panel 300. There may be various relationships in position between the barriers B and transmissive regions T of the converter 100 and the pixels of the display panel 300, which allow a left-eye image and a right-eye image to be viewed by a user's left eye and right eye, respectively.

Figure 8:
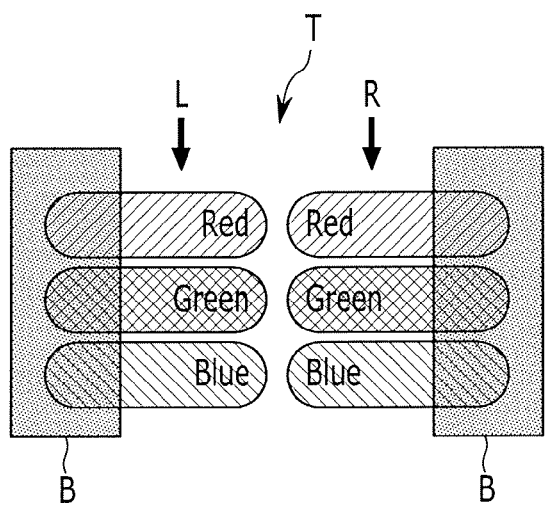
FIG. 8 and FIG. 9 are views of various relationships in position between barriers B and pixels in a 3D image display device according to exemplary embodiments of the present invention.
Figure 9:
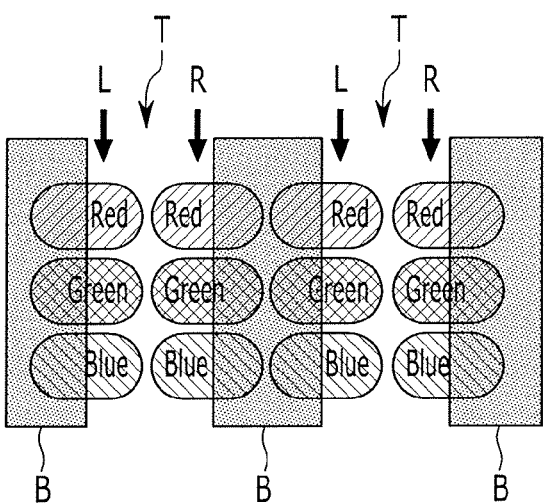

FIG. 8 and FIG. 9 are views of various relationships in position between barriers B and pixels in a 3D image display device according to exemplary embodiments of the present invention.

FIG. 8 and FIG. 9 show positions of the barriers B of the converter 100 and the pixels of the display panel 300 when viewing from the front side of the 3D image display device.

Referring to FIG. 8, two adjacent pixels are positioned opposite each other. Each of the two pixels has three color subpixels (red, green, and blue). The left-hand pixel L (also referred to as a left-eye pixel) displays a left-eye image, and the right-hand pixel R (also referred to as a right-eye pixel) displays a right-eye image.

Each barrier B of the converter 100 may cover a left portion of the pixel L and/or a right portion of the pixel R. The remaining region except where the barriers B are positioned includes a transmissive region T. The barriers B allow light emitted from the left-eye pixel L to reach a user's left eye and light emitted from the right-eye pixel R to reach the user's right eye, and thus, the user recognizes a 3D stereoscopic image. The width and the position of the barriers B may be varied according to a distance between the user and the display device 10.

Referring to FIG. 9, as compared with FIG. 8, the size of each pixel is reduced. For example, according to an exemplary embodiment of the present invention, the size of each pixel shown in FIG. 9 may be substantially half the size of each pixel shown in FIG. 8. Accordingly, the resolution of the display device 10 may be prevented from being reduced when displaying the 3D stereoscopic image.

Referring to FIG. 9, two adjacent pixels are positioned opposite each other. The left-hand pixel L is referred to as a left-eye pixel, and the right-hand pixel R is referred to as a right-hand pixel. Each of the pixels has three color subpixels (red, green, and blue). The left-eye pixel L and the right-eye pixel R are alternately and repeatedly formed. Each barrier B of the converter 100 may cover a left portion of the pixel L for displaying a left-eye image and/or a right portion of the pixel R for displaying the right-eye image. The remaining region except where the barriers B are positioned includes a transmissive region T.

Accordingly, the barriers B allow light emitted from the left-eye pixel L to reach a user's left eye and light emitted from the right-eye pixel R to reach the user's right eye, and thus, the user recognizes a 3D stereoscopic image. The width and the position of the barriers B may be varied according to a distance between the user and the display device 10.

In an exemplary embodiment of the present invention, the position of the barriers B may be changed.

Figure 10:
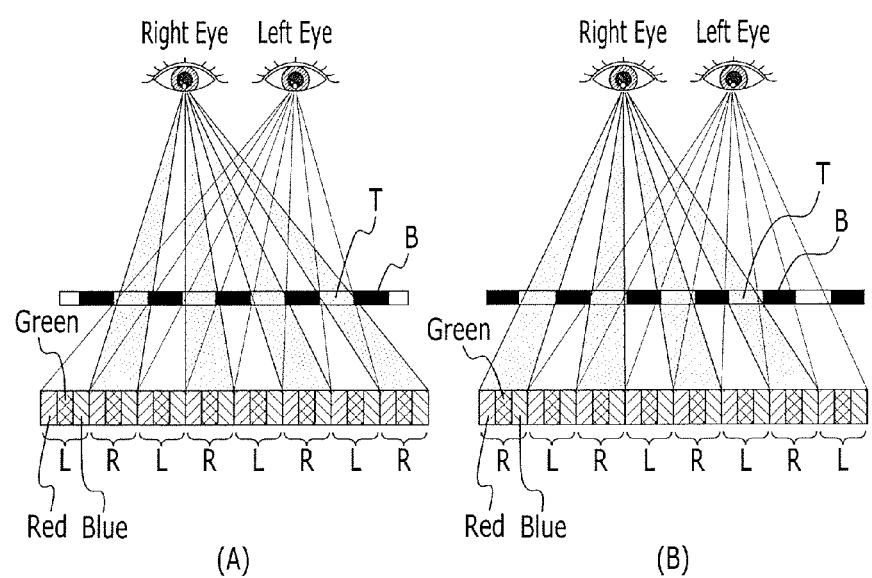
FIG. 10 is a view of a method of providing a 3-dimensional stereoscopic image according to an exemplary embodiment of the present invention.

FIG. 10 is a view of a method of providing a 3D stereoscopic image to a user according to an exemplary embodiment of the present invention.

The position of the barriers B of the converter 100 is changed according to time, and thus, the positions of pixels viewed by a user's right eye and the positions of pixels viewed by the user's left eye are changed.

For example, as illustrated in FIG. 10, the example shown in FIG. 10(A) and the example shown in FIG. 10(B) are alternately realized.

Referring to FIG. 10 (A), each pixel of the display panel 300 has three color subpixels (red, green, and blue), and left-eye pixels L for displaying a left-eye image and right-eye pixels R for displaying a right-eye image are alternately and repeatedly arranged.

In the converter 100, barriers B and transmissive regions T are alternately and repeatedly arranged. The barriers B are positioned so that a user's left eye views the left-eye pixels L and the user's right eye views the right-eye pixels R at the user's current position. In this case, the resolution of an image viewed by the user's both eyes may be reduced by half.

The right-eye pixels R that have not been viewed by the user's left eye and the left-eye pixels L that have not been viewed by the user's right eye in FIG. 10 (A) may be adjusted to be viewed by the user, thus preventing the resolution as perceived by the user from being reduced.

For example, as shown in FIG. 10 (B), the right-eye image, instead of the left-eye image, is displayed by the left-eye pixels L, and thus, the left-eye pixels L are turned into the right-eye pixels R. The right-eye pixels R display the left-eye image instead of the right-eye image and thus are turned into the left-eye pixels L.

The positions of the barriers B of the converter 100 are also changed. The positions of the barriers B are changed for the right-eye pixels R of FIG. 10 (B) to be recognized by the user's right eye and for the left-eye pixels L to be recognized by the user's left eye.

The left-eye image and the right-eye image of each of FIG. 10 (A) and FIG. 10 (B) do not include all of the data for the entire screen. For example, when the left-eye image of FIG. 10 (A) and the left-eye image of FIG. 10 (B) may be combined into a left-eye image for the entire screen, and when the right-eye image of FIG. 10 (A) and the right-eye image of FIG. 10 (B) may be combined into a right-eye image for the entire screen.

Accordingly, a 3D stereoscopic image may be displayed by the time-division scheme described above in connection with FIGS. 10(A) and 10(B), while maintaining the entire resolution.

Alternatively, a 3D stereoscopic image with a resolution reduced by half may be displayed by the method described above in connection with FIG. 10 (A) or by the method described above in connection with FIG. 10 (B).

The converter 100 may be formed by including, between the upper and lower substrates, the protrusion electrodes 190, the plate electrode 195, the conductive particles 155, and the transparent medium 150, and thus, the thickness of the converter 100 may be reduced.

The overall thickness of the display device 10 may be reduced by decreasing the thickness of the display panel 300.

Figure 11:
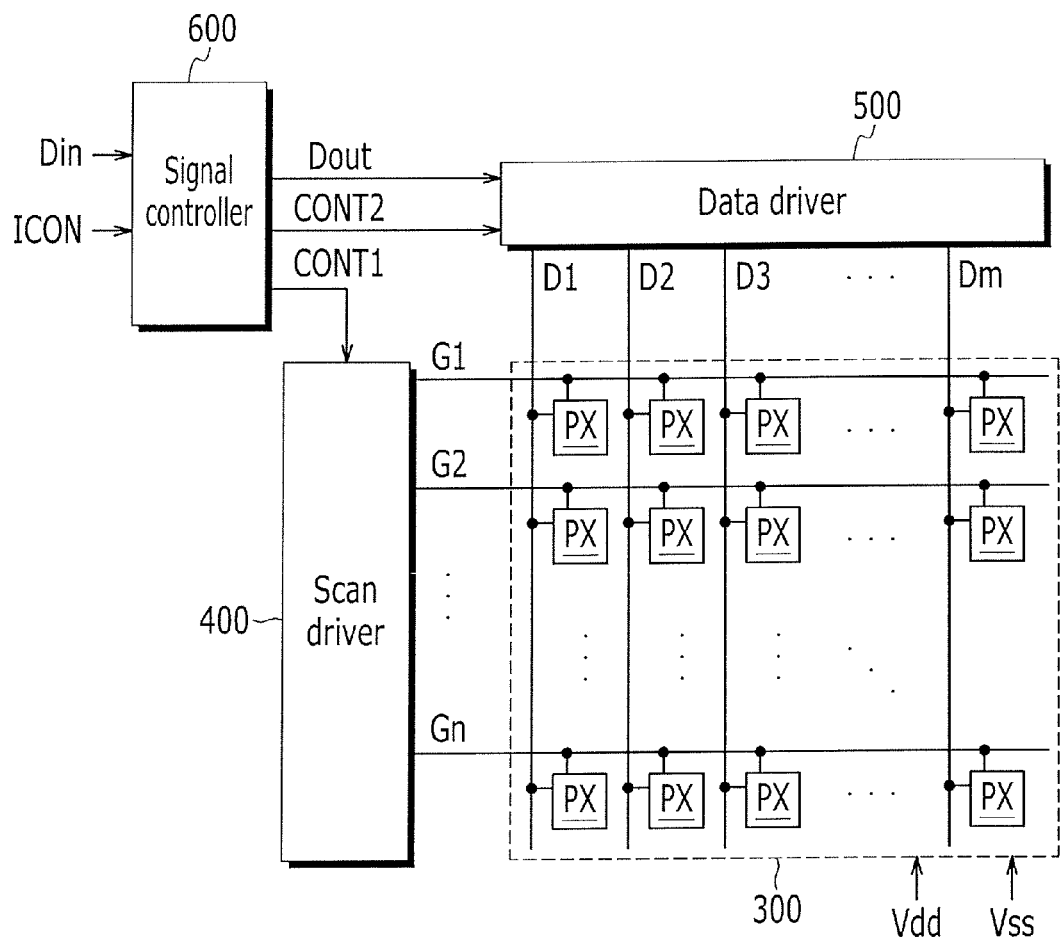
FIG. 11 and FIG. 12 are views of a 3D image display device according to an exemplary embodiment of the present invention.
Figure 12:
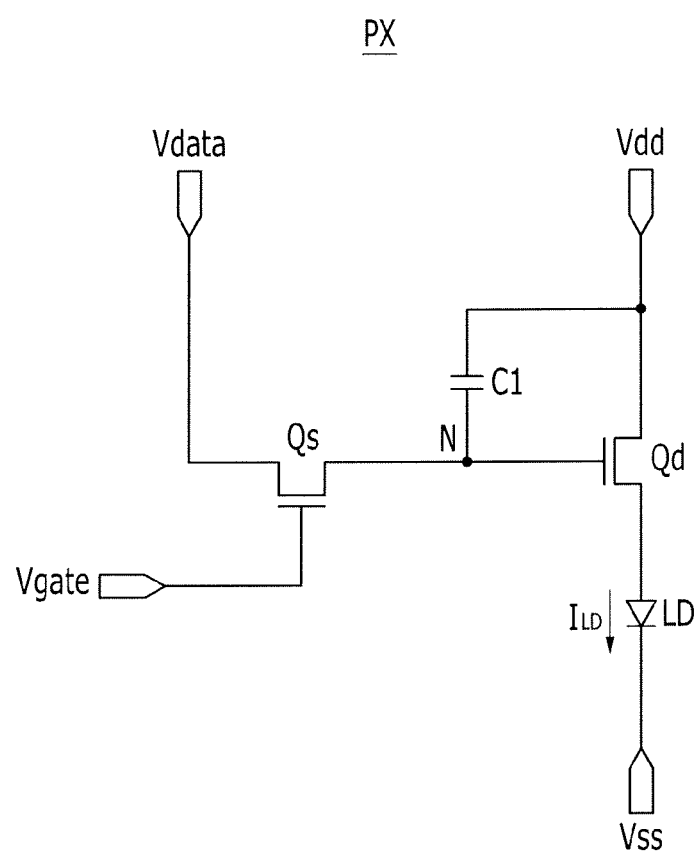

FIG. 11 and FIG. 12 are views of a 3D image display device according to an exemplary embodiment of the present invention.

FIG. 11 is a block diagram of an organic light emitting display device according to an exemplary embodiment of the present invention, and FIG. 12 is an equivalent circuit of a pixel of an organic light emitting display device according to an exemplary embodiment of the present invention.

Referring to FIG. 11, an organic light emitting display device according to an exemplary embodiment of the present invention includes a display panel 300, a scan driver 400, a data driver 500, and a signal controller 600.

The display panel 300 includes a plurality of signal lines G1-Gn and D1-Dm, a plurality of voltage lines, and a plurality of pixels PX that are connected to the signal lines G1-Gn and D1-Dm and that are arranged substantially in a matrix pattern.

The signal lines G1-Gn and D1-Dm include a plurality of scanning signal lines G1-Gn for transferring scanning signals to the pixels PX and a plurality of data lines D1-Dm for transferring data signals to the pixels PX. The scanning signal lines G1-Gn are extended substantially in a row direction of the pixels PX and are substantially parallel with each other. The data lines D1-Dm are extended substantially in a column direction of the pixels PX and are substantially parallel with each other. Each voltage line transmits a driving voltage Vdd and a common voltage Vss to its corresponding pixel PX.

As shown in FIG. 12, each pixel PX includes an organic light emitting element LD, a driving transistor Qd, a capacitor C1, and a switching transistor Qs.

The driving transistor Qd includes an output terminal, an input terminal, and a control terminal. The control terminal of the driving transistor Qd is connected to a node N, the input terminal is connected to the driving voltage Vdd, and the output terminal is connected to a terminal of the organic light emitting element LD.

A terminal of the capacitor C1 is connected to the node N and the other terminal is connected to the driving voltage Vdd. The capacitor C1 is connected between the control terminal and the input terminal of the driving transistor Qd, and is charged with an electric charge corresponding to a difference between the data voltage Vdata supplied through the switching transistor Qs and the driving voltage Vdd.

The switching transistor Qs has an output terminal, an input terminal, and a control terminal. The control terminal of the switching transistor Qs is connected to the scan signal lines G1-Gn, receiving a gate voltage Vgate. The input terminal is connected to the data line D1-Dm, receiving the data voltage Vdata. The output terminal is connected to the node N. The gate voltage Vgate includes a gate-on voltage Von and a gate-off voltage Voff. The gate-on voltage Von turns on the switching transistor Qs, and the gate-off voltage Voff turns off the switching transistor Qs.

The switching transistor Qs is turned on by a gate-on voltage Von that is supplied through the scanning signal lines G1-Gn, and the switching transistor Qs transfers the data voltage Vdata to the control terminal of the driving transistor Qd via the contact point N.

The switching transistor Qs and the driving transistor Qd each include an n-channel metal oxide semiconductor field effect transistor (MOSFET) formed of amorphous silicon or polysilicon. Alternatively, the transistors Qs and Qd each may include a p-channel MOSFET, and in this case, because the p-channel MOSFET and the n-channel MOSFET are complementary from each other in light of operation, voltages, and currents.

The organic light emitting element LD is a light emitting diode (LED) having an emission layer. The organic light emitting element LD has an anode and a cathode. The anode is connected to the output terminal of the driving transistor Qd, and the cathode is connected to a common voltage Vss terminal. The organic light emitting element LD emits light with different intensities according to the magnitude of a current ILD that is supplied via the driving transistor Qd. The magnitude of the current ILD depends on the magnitude of a voltage between the control terminal and the input terminal of the driving transistor Qd.

Referring back to FIG. 11, the scan driver 400 is connected to the scan signal lines $G_1$-$G_n$ of the display panel 300, and the scan driver 400 applies the gate voltage Vgate obtained by combining the gate-on voltage Von with the gate-off voltage Voff to the scan signal lines $G_1$-$G_n$.

The data driver 500 is connected to the data lines D1 to Dm of the display panel 300, and the data driver 500 applies the data voltages VDATA for representing image signals to the data lines D1 to Dm.

The signal controller 600 controls the operation of the scan driver 400 and the data driver 500. The signal controller 600 controls applying voltages to the protrusion electrodes 190 and the plate electrode 195 of the converter 100, controlling the positions of the barriers B.

Each of the driving devices 400, 500, and 600 may be directly mounted on the display panel 300 in at least one IC chip, or each of the driving devices 400, 500, and 600 may be mounted on a flexible printed circuit film and attached to the display panel 300 as a TCP (tape carrier package). Each of the driving devices 400, 500, and 600 may be mounted on a separate printed circuit board (PCB). Alternatively, the driving apparatus 400, 500, and 600 may be integrated into the display panel 300, together with the signal lines $G_1$-$G_n$ and $D_1$-$D_m$ and the transistors Qs, Qd, Qi.

Although the organic light emitting display panel has been described as an example of the display panel 300 of the 3D image display device 10, exemplary embodiments of the present invention are not limited thereto. Alternatively, a liquid crystal display panel may be used in the display device 10.

Figure 13:
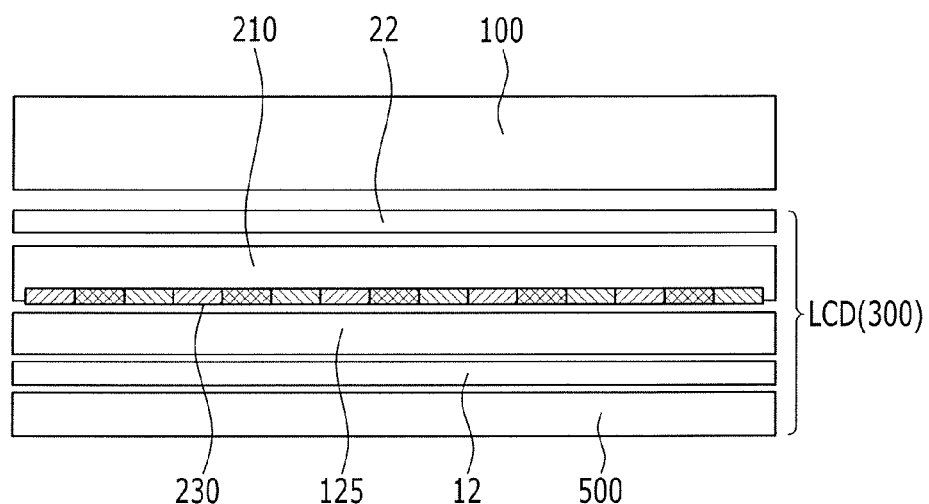
FIG. 13 is a cross-sectional view of a 3D image display device according to an exemplary embodiment of the present invention.

FIG. 13 is a cross-sectional view of a 3D image display device according to an exemplary embodiment of the present invention.

The 3D image display device 10 according to an exemplary embodiment of FIG. 13 includes a converter 100 and a display panel 300. The display panel 300 includes a lower display panel 125 with wires and thin film transistors, a liquid crystal layer 3, an upper display panel 210 including color filters 230, an upper polarization film 22, a lower polarization film 12, and a backlight unit 500.

The lower display panel 125 includes gate lines for transmitting gate signals to their corresponding pixels, data lines for transmitting data voltages to their corresponding pixels, thin film transistors (or switches) connected to the gate lines and the data lines, and pixel electrodes connected to the output terminals of the thin film transistors on an insulation substrate, and the lower polarization film 12 is attached to an outer surface of the insulation substrate.

The upper display panel 210 has a black matrix of a lattice structure. Openings are formed on the insulation substrate. The color filters 230 are disposed between the openings. A common electrode is formed on the black matrix and the color filters 230. The upper polarization film 22 is attached to an outer surface of the upper display panel 210.

The liquid crystal layer 3 is positioned between the lower display panel 125 and the upper display panel 210. The alignment direction of the liquid crystal molecules in the liquid crystal layer 3 is changed by an electric field formed between the common electrode and the pixel electrodes.

The backlight unit 500 is positioned under the lower display panel 125. The backlight unit 500 includes a light source, a reflection sheet, and a plurality of optical films to provide light toward the lower display panel 125. The backlight unit 500 may further include a light guide plate according to an exemplary embodiment of the present invention.

According to exemplary embodiments of the present invention, a converter for a 3D image display device includes conductive particles, such as E-Ink™, and protrusion electrodes and a plate electrode. Accordingly, the thickness of the display device may be made thin. Further, no polarization film is used, increasing the transmittance of the display device.

While the inventive concept has been shown and described with reference to exemplary embodiments thereof, it will be apparent to those of ordinary skill in the art that various changes in form and detail may be made thereto without departing from the spirit and scope of the inventive concept as defined by the following claims.

What is claimed is:

1. A display device, comprising:
   a display panel; and
   a converter formed on a front surface of the display panel, the converter configured to perform conversion between a 2-dimensional image and a 3-dimensional image, wherein the converter comprises:
      a plurality of protrusion electrodes formed on a first substrate;
      a plate electrode positioned on a second substrate facing the first substrate;
      a transparent medium positioned between the protrusion electrodes and the plate electrode; and
      a plurality of conductive particles positioned in the transparent medium.

2. The display device of claim 1, wherein the converter further comprises a barrier and a transmissive region that are formed by applying voltages to the protrusion electrodes and the plate electrode.

3. The display device of claim 2, wherein at least one of the plate electrode and the plurality of protrusion electrodes is formed of a transparent conductive material.

4. The display device of claim 2, wherein the protrusion electrodes and the plate electrode are separated from each other by a predetermined interval.

5. The display device of claim 4, wherein the plurality of protrusion electrodes extend in a direction in which the barrier extends.

6. The display device of claim 5, wherein two adjacent protrusion electrodes of the protrusion electrodes are spaced apart from each other by a predetermined interval.

7. The display device of claim 1, wherein the plurality of conductive particles is black.

8. The display device of claim 1, wherein the display panel is configured to alternately display a left-eye image and a right-eye image when displaying the 3-dimensional image.

9. The display device of claim 8, wherein the display panel is one of flat display panels including an organic light emitting display panel, a liquid crystal display panel, a plasma display panel (PDP), an electrophoretic display panel, and an electrowetting display panel.

10. A converter configured to perform conversion between a 2-dimensional image and a 3-dimensional image, the converter comprising:
   a plurality of protrusion electrodes formed on a first substrate;
   a plate electrode positioned on a second substrate facing the first substrate;
   a transparent medium positioned between the protrusion electrodes and the plate electrode; and
   a plurality of conductive particles positioned in the transparent medium.

11. The converter of claim 10, wherein the converter further comprises a barrier and a transmissive region that are formed by applying voltages to the protrusion electrodes and the plate electrode.

12. The converter of claim 11, wherein at least one of the plate electrode and the plurality of protrusion electrodes is formed of a transparent conductive material.

13. The converter of claim 12, wherein the protrusion electrodes and the plate electrode are separated from each other by a predetermined interval.

14. The converter of claim 13, wherein the plurality of protrusion electrodes extend in a direction in which the barrier extends.

15. The converter of claim 14, wherein two adjacent protrusion electrodes of the plurality of neighboring protrusion electrodes are spaced apart from each other by a predetermined interval.

16. The converter of claim 10, wherein a plurality of conductive particles is black.

17. A display, comprising:
   a display panel; and
   a converter disposed on the display panel, the converter comprising:
      a first substrate having a plate electrode;

a second substrate having a plurality of protrusion electrodes spaced apart from each other by a predetermined distance;

a transparent medium interposed between the first substrate and the second substrate, the transparent medium including a plurality of conductive particles, wherein the plurality of conductive particles are configured to interact with the plurality of protrusion electrodes upon application of a voltage between the plate electrode and the plurality of protrusion electrodes to form a barrier and a transmissive region along a direction of the converter.

18. The display of claim 17, wherein when the display panel displays a two-dimensional image, the barrier is not formed.

* * * * *